United States Patent
Fujiwara et al.

(10) Patent No.: US 10,985,683 B2
(45) Date of Patent: Apr. 20, 2021

(54) ELECTRIC MOTOR CONTROL DEVICE AND ELECTRIC MOTOR CONTROL METHOD

(71) Applicant: PANASONIC INTELLECTUAL PROPERTY MANAGEMENT CO., LTD., Osaka (JP)

(72) Inventors: Hiroshi Fujiwara, Osaka (JP); Toru Tazawa, Osaka (JP); Fumitake Saegusa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/613,762

(22) PCT Filed: May 18, 2018

(86) PCT No.: PCT/JP2018/019213
§ 371 (c)(1),
(2) Date: Nov. 14, 2019

(87) PCT Pub. No.: WO2018/230253
PCT Pub. Date: Dec. 20, 2018

(65) Prior Publication Data
US 2020/0083834 A1     Mar. 12, 2020

(30) Foreign Application Priority Data
Jun. 15, 2017  (JP) ............... JP2017-118065

(51) Int. Cl.
*H02P 23/04*     (2006.01)
*H02P 29/40*     (2016.01)
*G05B 13/02*     (2006.01)

(52) U.S. Cl.
CPC .............. *H02P 23/04* (2013.01); *H02P 29/40* (2016.02); *G05B 13/024* (2013.01); *G05B 2219/41166* (2013.01); *H02P 2203/11* (2013.01)

(58) Field of Classification Search
CPC .... G05B 13/024; H02P 21/05; H02P 2203/11; H02P 23/04; H02P 29/40
See application file for complete search history.

(56) References Cited

U.S. PATENT DOCUMENTS

| 4,494,050 A | * | 1/1985 | Godfrey | ................. H02P 7/347 |
| | | | | 318/140 |
| 5,404,418 A | * | 4/1995 | Nagano | .................. G05B 19/19 |
| | | | | 388/806 |

(Continued)

FOREIGN PATENT DOCUMENTS

| JP | 2004-007955 A | 1/2004 |
| JP | 2004-274976 A | 9/2004 |

OTHER PUBLICATIONS

International Search Report and Written Opinion dated Jul. 24, 2018 in International Application No. PCT/JP2018/019213; with partial English translation.

(Continued)

*Primary Examiner* — Thai T Dinh
(74) *Attorney, Agent, or Firm* — McDermott Will and Emery LLP

(57) ABSTRACT

An electric motor control device performing feedback control of a state amount of an electric motor or a load and being capable of changing a control bandwidth of a feedback control system includes: a notch filter arranged in the feedback control system and having a filter coefficient which is changeable; a notch control section which changes a notch frequency as a center frequency of the notch filter to remove an oscillation component attributable to mechanical reso- (Continued)

nance related to the electric motor; and a control coefficient setting section which changes at least one of the control bandwidth or the filter coefficient of the notch filter in accordance with the control bandwidth and the notch frequency to stabilize the feedback control system.

8 Claims, 6 Drawing Sheets

(56) References Cited

U.S. PATENT DOCUMENTS

| | | | | |
|---|---|---|---|---|
| 7,068,923 B2* | 6/2006 | Miyazaki | ............... | H02P 29/045 388/806 |
| 8,378,615 B2* | 2/2013 | Tazawa | ............... | H02P 6/10 318/619 |
| 8,901,872 B2* | 12/2014 | Tazawa | ............... | H02P 29/50 318/619 |
| 9,429,936 B2* | 8/2016 | Iijima | ............... | G05B 19/404 |
| 2004/0085035 A1* | 5/2004 | Tazawa | ............... | H02P 6/06 318/432 |
| 2006/0091845 A1* | 5/2006 | Consoli | ............... | H02P 6/183 318/701 |
| 2008/0309279 A1* | 12/2008 | Tazawa | ............... | H02P 23/04 318/619 |

OTHER PUBLICATIONS

Wang. W., et al., "Detection and Reduction of Middle-Frequency Resonance for Industrial Servo with Self-Tuning Lowpass Filter," Journal of Control Science and Technology. vol. 2012; Jan. 1, 2012 (Jan. 1, 2012); pp. 1-12; XP055662585; ISSN: 1687-5249, DOI: 10.1155/2012/478907.

Wang. W., et al., "Detection and Reduction of Middle-Frequency Resonance for Industrial Servo with Self-Tuning Lowpass Filter," Journal of Control Science and Engineering. vol. 2012; Jan. 1, 2012 (Jan. 1, 2012); pp. 1-12; XP055662585; ISSN: 1687-5249, DOI: 10.1155/2012/478907.

Extended European Search Report dated May 15, 2020, issued in corresponding European Patent Application No. 18817576.4.

* cited by examiner

ELECTRIC MOTOR CONTROL DEVICE AND ELECTRIC MOTOR CONTROL METHOD

CROSS-REFERENCE OF RELATED APPLICATIONS

This application is the U.S. National Phase under 35 U.S.C. § 371 of International Patent Application No. PCT/JP2018/019213, filed on May 18, 2018, which in turn claims the benefit of Japanese Application No. 2017-118065, filed on Jun. 15, 2017, the entire disclosures of which Applications are incorporated by reference herein.

TECHNICAL FIELD

The present invention relates to an electric motor control device which controls driving operation, including speeds and positions, of an electric motor and a mechanical load driven by the electric motor, and more specifically to an electric motor control device including the function of suppressing mechanical resonance occurring upon, for example, driving.

BACKGROUND ART

Electric motor control devices capable of suppressing oscillation caused by mechanical resonance have conventionally been known (refer to, for example, Patent Literature 1 (PTL 1)).

CITED LITERATURE

Patent Literature

PTL 1: Japanese Unexamined Patent Application Publication No. 2004-274976

SUMMARY OF THE INVENTION

Technical Problem

However, in the conventional electric motor control devices, the mechanical resonance frequency overlaps the control bandwidth of a feedback control system, which may result in oscillation caused by the destabilization of the feedback control system.

Thus, in view of the problem described above, the present invention has been made and it is an object of the invention to provide an electric motor control device and an electric motor control method which can more prevent oscillation caused by the destabilization of a feedback control system than a conventional electric motor control device and a conventional electric motor control method can.

Solution to Problem

According to one aspect of the present invention, an electric motor control device performing feedback control of a state amount of an electric motor or a load and being capable of changing a control bandwidth of a feedback control system, includes: a notch filter arranged in the feedback control system and having a filter coefficient which is changeable; a notch control section which changes a notch frequency as a center frequency of the notch filter to remove an oscillation component attributable to mechanical resonance related to the electric motor; and a control coefficient setting section which changes at least one of the control bandwidth or the filter coefficient of the notch filter in accordance with the control bandwidth and the notch frequency to stabilize the feedback control system.

According to another aspect of the present invention, an electric motor control method for performing feedback control of a state amount of an electric motor or a load by an electric motor control device capable of changing a control bandwidth of a feedback control system includes; changing a notch frequency, as a center frequency of a notch filter arranged in the feedback control system and having a filter coefficient which is changeable, to remove an oscillation component attributable to mechanical resonance related to the electric motor; and changing at least one of the control bandwidth or the filter coefficient of the notch filter in accordance with the control bandwidth and the notch frequency to stabilize the feedback control system.

Advantageous Effect of Invention

With the electric motor control device and the electric motor control method described above, it is possible to more prevent oscillation caused by the destabilization of a feedback control system than in a conventional case.

DESCRIPTION OF EXEMPLARY EMBODIMENTS

Figure 1:
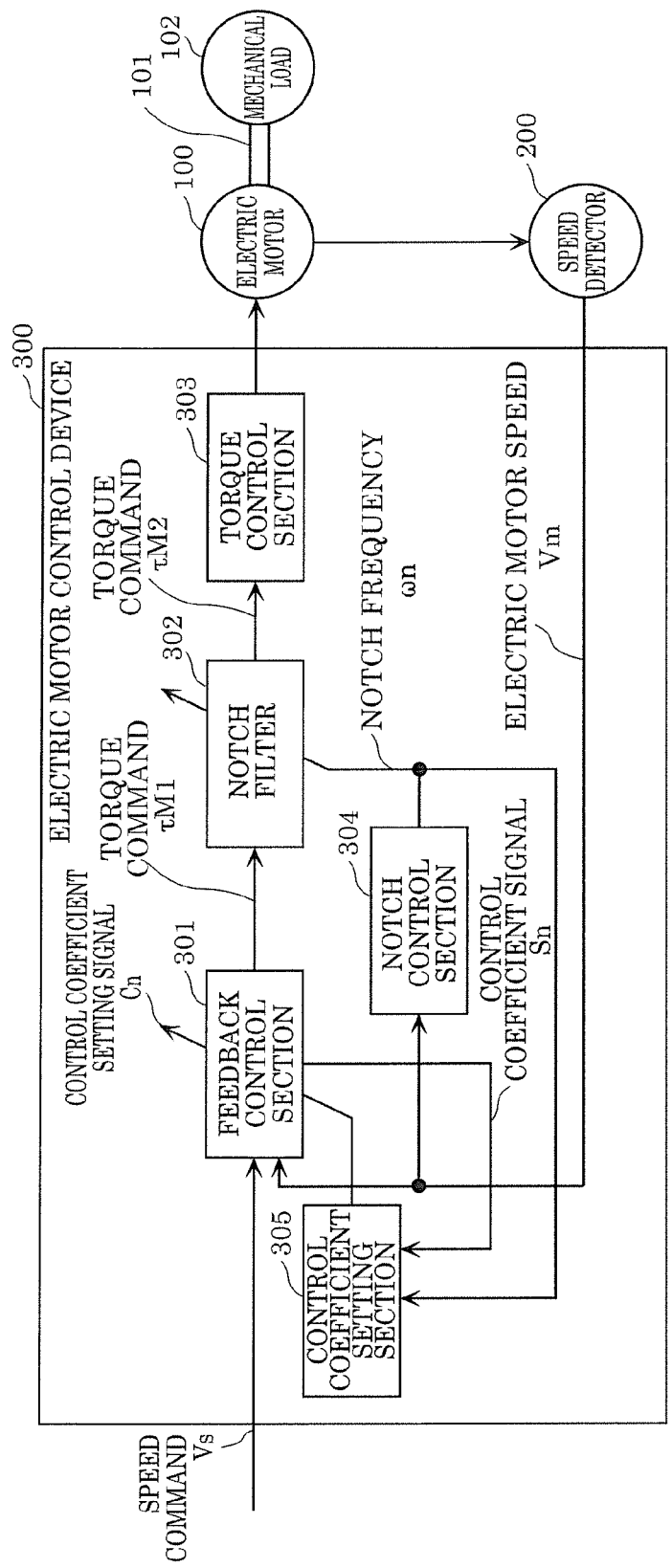
FIG. 1 is a block diagram illustrating one example of a configuration of an electric motor control device according to Embodiment 1.

Background for Achieving One Embodiment of the Present Invention

A typical electric motor control device forms therein a feedback control system which brings electric motor operation into agreement with an operation command. A technique is known which includes, in a feedback control system of an electric motor control device, a notch filter for attenuating a specific frequency component in order to prevent the occurrence of mechanical resonance oscillation under the presence of mechanical resonance between an electric motor and a mechanical load. With agreement achieved between the mechanical resonance frequency and a notch frequency as the frequency to be attenuated by the notch filter, a mechanical resonance oscillation component is attenuated by the notch filter, which can suppress the mechanical resonance oscillation. However, when a change occurs in the mechanical resonance frequency as a result of long-term driving of machine equipment, there arises a difference between the notch frequency and the mechanical resonance frequency, which can no longer suppress the mechanical resonance oscillation. Suppressing the mechanical resonance oscillation even with a great change occurring in the mechanical resonance frequency requires constant agreement of the notch frequency with the mechanical resonance frequency.

PTL 1 discloses a technology as the conventional electric motor control device of the aforementioned type. With this technology, upon the occurrence of mechanical resonance oscillation during operation of an electric motor, a mechanical resonance oscillation component is extracted from electric motor speed information of the electric motor and a notch frequency is sequentially changed to reduce the amplitude of the extracted oscillation component, thereby achieving automatic adjustment such that the notch frequency and the mechanical resonance frequency constantly agree with each other.

The inventor has found that the following problem related to the conventional electric motor control device arises.

The notch filter used for suppressing the mechanical resonance oscillation has the effect of delaying a phase in frequency bands less than or equal to the notch frequency. The overlapping of the notch frequency with the control bandwidth of the feedback control system causes the notch filter to destabilize the feedback control system, leading to oscillation. Therefore, when using the notch filter, the control bandwidth of the feedback control system needs to be reduced with respect to the notch frequency to prevent the notch frequency from overlapping the control bandwidth of the feedback control system. However, only achieving the constant agreement between the notch frequency and the mechanical resonance frequency is considered in the conventional electric motor control device. Thus, when the mechanical resonance frequency decreases to such an extent that overlaps the control bandwidth of the feedback control system due to, for example, degradation of a mechanism member as a result of long-term driving of machine equipment, the notch frequency also decreases to such an extent that overlaps the control bandwidth of the feedback control system, which may cause operation abnormality following the oscillation caused by the destabilization of the feedback control system. Upon the occurrence of the operation abnormality, the degraded mechanism member is replaced to recover the machine equipment. However, it is time-consuming to perform arrangement of a replaced member, replacement operation, etc. since performing regular facility maintenance is scheduled to be on a different occasion, which in turn requires great deal of time until restart of the machine equipment. Thus, there has been a demand on the machine equipment for preventing operation abnormality such as oscillation.

In view of the problem described above, the inventor has obtained an electric motor control device and an electric motor control method according to one embodiment of the present invention.

An electric motor control device according to one embodiment of the present invention performs feedback control of a state amount of an electric motor or a load and is cable of changing a control bandwidth of a feedback control system. The electric motor control device is characterized by including: a notch filter arranged in the feedback control system and having a filter coefficient which is changeable; a notch control section which changes a notch frequency as a center frequency of the notch filter to remove an oscillation component attributable to mechanical resonance related to the electric motor; and a control coefficient setting section which changes at least one of: the control bandwidth and the filter coefficient of the notch filter in accordance with the control bandwidth and the notch frequency to stabilizes the feedback control system.

The electric motor control device changes at least one of the control bandwidth and the filter coefficient of the notch filter to stabilize the feedback control system.

Therefore, with this electric motor control device, it is possible to more prevent oscillation caused by the destabilization of the feedback control system than in conventional cases.

For example, the control coefficient setting section may change at least one of the control bandwidth and the notch frequency to stabilize the feedback control system only when the notch frequency falls below a predetermined reference value.

Consequently, setting the predetermined reference value at a frequency value which is sufficiently higher than the control bandwidth of the feedback control system makes it possible to limit the change in at least one of the control bandwidth and the filter coefficient of the notch filter to a case where the frequency of the mechanical resonance decreases to such an extent that overlaps the control bandwidth.

For example, the notch control section may change the notch frequency only within a predefined range of notch frequencies.

Consequently, it is possible to prevent the notch frequency from falling in an unfavorable frequency bandwidth.

For example, the predefined range of notch frequencies may be defined to prevent the notch frequency from overlapping the control bandwidth of the feedback control system.

Consequently, it is possible to prevent the oscillation caused by the destabilization of the feedback control system attributable to a change in the notch frequency.

For example, an electric motor control device performs feedback control of a state amount of an electric motor or a load and is capable of changing a control bandwidth of a feedback control system. The electric motor control device may include: a first filter and a second filter serially arranged in the feedback control system and having a filter coefficient which is changeable; a first notch control section which changes a first notch frequency as a center frequency of the first notch filter to remove an oscillation component attributable to mechanical resonance related to the electric motor; a second notch control section which changes a second notch frequency as a center frequency of the second notch filter to remove the oscillation component attributable to the mechanical resonance related to the electric motor; and a control coefficient setting section which changes at least one of the control bandwidth, the filter coefficient of the first notch filter, and the filter coefficient of the second notch filter in accordance with the control bandwidth, the first notch frequency, and the second notch frequency to stabilize the feedback control system.

Consequently, the oscillation caused by the destabilization of the feedback control system can be prevented even when two mechanical resonance frequencies are provided.

Moreover, an electric motor control method according to one aspect of the present invention is implemented by an electric motor control device which performs feedback control of a state amount of an electric motor or a load and which has a changeable control bandwidth of a feedback control system. The electric motor control method is characterized by including: changing a notch frequency as a center frequency of a notch filter, arranged in the feedback control system and having a filter coefficient which is changeable, to remove an oscillation component attributable to mechanical resonance related to the electric motor; and changing at least one of the control bandwidth and the filter coefficient of the notch filter in accordance with the control bandwidth and the notch frequency to stabilize the feedback control system.

The electric motor control method includes changing at least one of the control bandwidth and the filter coefficient of the notch filter to stabilize the feedback control system.

Therefore, with the electric motor control method, it is possible to more prevent occurrence of the oscillation caused by the destabilization of the feedback control system than in conventional cases.

Note that the inclusive or detailed embodiments may be realized in, for example, a system, a method, an integrated circuit, a computer program, or a recording medium such as a computer-readable CD-ROM or may be realized through a desired combination of a system, a method, an integrated circuit, a computer program, or a recording medium.

Hereinafter, the embodiments of the present invention will be described with reference to the drawings. Note that the present invention is not limited by the embodiments described below. Each of the embodiments described below illustrates one detailed preferable example of the present invention. Therefore, numerical values, shapes, materials, components, arrangement positions of the components, connection modes, etc. as well as steps, a sequence of the steps, etc. indicated in the embodiments below form one example and are not intended to limit the present invention in any manner. The present invention is only limited by the scope of the claims. Accordingly, of the components in the embodiments below, those which are not described in an independent claim indicating a superordinate concept of the present invention will be described as components which are not essential to achieve the object of the present invention but form a more preferred embodiment.

Embodiment 1

FIG. 1 is a block diagram illustrating one example of a configuration of an electric motor control device according to Embodiment 1. Electric motor control device 300 performs feedback control of the state amount of electric motor 100 and can change a control bandwidth of a feedback control system.

As illustrated in FIG. 1, electric motor control device 300 is connected to electric motor 100 and speed detector 200 and receives input of a speed command Vs indicating desired operation of mechanical load 102 and electric motor 100 to be driven. Mechanical load 102 serving as a section for driving machine equipment is linked to electric motor 100 with joint 101 in between. Speed detector 200 detects the rotation speed of electric motor 100 and outputs the rotation speed as an electric motor speed Vm to electric motor control device 300.

Electric motor control device 300 has therein: feedback control section 301, notch filter 302, torque control section 303, notch control section 304, and control coefficient setting section 305.

Feedback control section 301 receives input of the electric motor speed Vm and the speed command Vs and outputs torque command τM1 which sets a difference therebetween at zero. For example, a difference value between the speed command Vs and the electric motor speed Vm is calculated, and a value obtained by proportionally integrating the calculated difference value is multiplied by a changeable control bandwidth indicating the control bandwidth of the feedback control system, and the obtained value is outputted as torque command τM1.

Notch filter 302 is a filter arranged in the feedback control system and having a filter coefficient which is changeable. Specifically, notch filter 302 is a filter which attenuates and outputs a signal component contained in a specific frequency as a center frequency in response to an input signal. The center frequency to be attenuated is called notch frequency. Torque command τM1 is inputted as an input signal, the signal component of the notch frequency as the center frequency is attenuated based on torque command τM1, and new torque command τM2 is outputted.

Torque control section 303 controls, for example, a current flowing to, for example, electric motor 100 in a manner such that the torque of the electric motor agrees with torque command τM2.

As described above, electric motor control device 300 forms therein the feedback control system in a manner such that the speed command Vs and the electric motor speed Vm agree with each other.

Moreover, electric motor control device 300 has, therein: notch control section 304 which sequentially changes the notch frequency of notch filter 302 to automatically bring the notch frequency into agreement with the oscillation frequency upon appearance of oscillation in the electric motor speed; and control coefficient setting section 305 which automatically changes the control coefficient of feedback control section 301 to keep the feedback control system constantly stable when the notch frequency decreases down to the control bandwidth of the feedback control system.

Notch control section 304 changes the notch frequency as the center frequency of notch filter 302 to remove an oscillation component attributable to mechanical resonance related to electric motor 100. Specifically, notch control section 304 receives input of the electric motor speed Vm and, upon the appearance of mechanical resonance oscillation in the electric motor speed Vm, automatically and sequentially changes the notch frequency of notch filter 302 to reduce the amplitude of the oscillation. Consequently, the notch frequency of notch filter 302 is changed to constantly agree with the mechanical resonance frequency, which can suppress the mechanical resonance oscillation.

Control coefficient setting section 305 changes the control bandwidth in accordance with the control bandwidth and the notch frequency to stabilize the feedback control system. More specifically, control coefficient setting section 305 receives input of: a notch frequency ωn controlled to agree with the mechanical resonance frequency by notch control section 304; and a control coefficient signal Sn indicating a current set value of the control coefficient of feedback control section 301. Control coefficient setting section 305 determines based on the inputted information whether the feedback control system is destabilized as a result of overlapping of the notch frequency with the control bandwidth of the feedback control system. Upon determination that the feedback control system is destabilized, control coefficient setting section 305 outputs, to feedback control section 301, a control coefficient setting signal Cn indicating decreasing the control bandwidth of the feedback control system. Feedback control section 301 changes the inner control coefficient in accordance with the inputted control coefficient setting signal Cn to reduce the control bandwidth of the feedback control system. Consequently, the oscillation caused by the destabilization of the feedback control system can be prevented by changing the control coefficient of the feedback control system to stabilize the feedback control system when the notch frequency decreases to such an extent that overlaps the control bandwidth of the feedback control system.

Next, notch filter 302 arranged in the feedback control system of electric motor control device 300 and having the filter coefficient which is changeable will be described in detail. Notch filter 302 is, for example, a secondary recursive notch filter with, for example, transfer function Gn1(s) shown in (Formula 1) below.

[Formula 1]

$$G_{n1}(s) = \frac{s^2 + 2d_{n1}\zeta_{n1}\omega_{n1}s + \omega_{n1}^2}{s^2 + 2\zeta_{n1}\omega_{n1}s + \omega_{n1}^2} \quad \text{(Formula 1)}$$

In Formula (1), $\omega n1$ represents a notch frequency coefficient of notch filter 302, $\zeta n1$ represents an attenuation coefficient indicating the width of a frequency band to be attenuated, and dn1 represents a notch depth coefficient indicating the degree of the attenuation. The notch depth coefficient dn1 is 0≤dn1≤1, and where dn1=1, the gain characteristic at the notch frequency $\omega n1$ of notch filter 302 is 0[dB] and where dn1=0, the gain characteristic at the notch frequency $\omega n1$ of notch filter 302 is −∞[dB].

Figure 2:
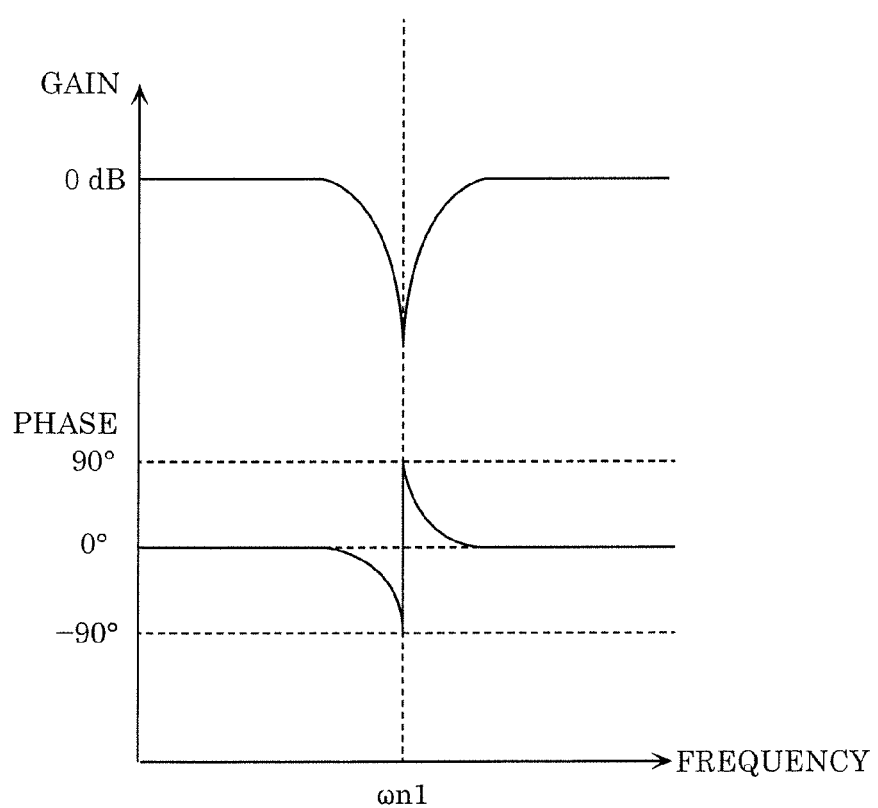
FIG. 2 is a diagram illustrating one example of the frequency characteristics of a notch filter.

FIG. 2 illustrates frequency characteristics of transmission function Gn1(s) where dn1=0 as an example illustrating the characteristics of notch filter 302. As can be understood from FIG. 2, notch filter 302 has a characteristic of attenuating a component of notch frequency $\omega n1$, and the gain characteristic is −∞. When an input signal contains an oscillation component, the amplitude of the input signal is not attenuated if the oscillation frequency of the input signal and notch frequency $\omega n1$ differ from each other while the amplitude is attenuated if the oscillation frequency and notch frequency $\omega n1$ agree with each other.

Notch frequency $\omega n1$ of notch filter 302 can be changed, and upon occurrence of mechanical resonance oscillation, notch frequency $\omega n1$ can be changed by notch control section 304 to agree with the mechanical resonance frequency to thereby attenuate the mechanical resonance frequency component from torque command τM1 and suppress the mechanical resonance oscillation.

Figure 3:
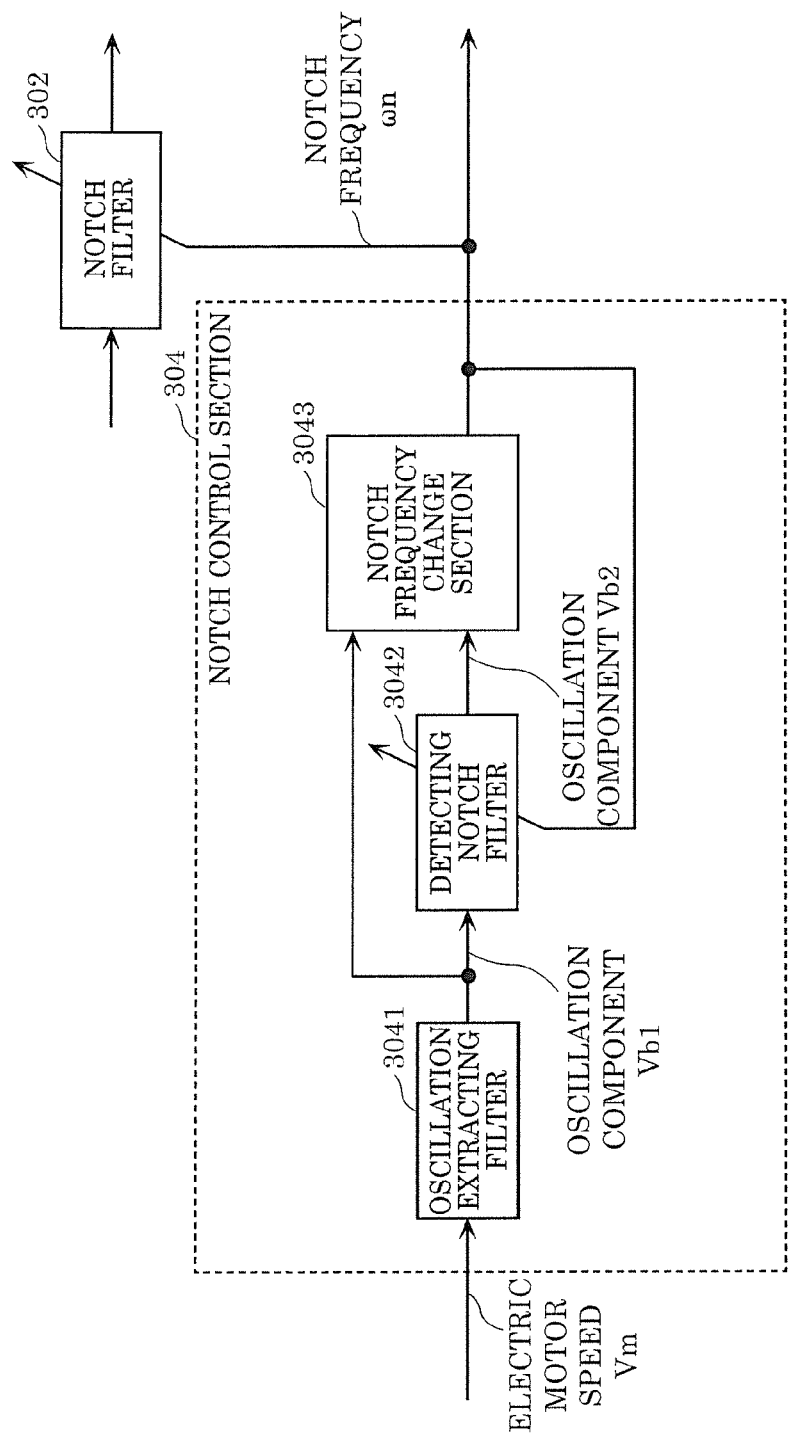
FIG. 3 is a block diagram illustrating one example of a configuration of a notch control section according to Embodiment 1.

FIG. 3 is a diagram illustrating one example of a configuration of notch control section 304. Notch control section 304 includes: oscillation extracting filter 3041, detecting notch filter 3042, and notch frequency change section 3043. Notch control section 304 sequentially changes notch frequency $\omega n1$ of notch filter 302 to reduce the amplitude of oscillation upon the occurrence of mechanical resonance oscillation, thereby achieving agreement between notch frequency $\omega n1$ and the mechanical resonance frequency.

Oscillation extracting filter 3041 is a filter which extracts and outputs a component in a predetermined frequency band from the input signal, extracts the mechanical resonance oscillation component from the electric motor speed Vm and outputs it as oscillation component Vb1. Oscillation extracting filter 3041 is only required to extract the oscillation component as described above and thus may be a high-pass filter which permits passage of signal components in a predetermined frequency or more and may also be a band-pass filter which permits passage of signal components in a predetermined frequency band.

Oscillation component Vb1 outputted from oscillation extracting filter 3041 is inputted to detecting notch filter 3042 and notch frequency change section 3043.

Detecting notch filter 3042 attenuates the frequency component mainly focused on the notch frequency as a center frequency with respect to oscillation component Vb1 and outputs the aforementioned frequency component as new oscillation component Vb2.

In the present embodiment, as the characteristic of detecting notch filter 3042, a predetermined value is previously provided as the width of the frequency band to be attenuated and the gain characteristic in the notch frequency is −∞[dB]. Provided is, for example, a secondary recursive notch filter having transfer function Gn2(s) shown in (Formula 2) below:

[Formula 2]

$$G_{n2}(s) = \frac{s^2 + \omega_{n2}^2}{s^2 + 2\zeta_{n2}\omega_{n2}s + \omega_{n2}^2}. \quad \text{(Formula 2)}$$

Here, $\omega n2$ represents a notch frequency coefficient corresponding to the notch frequency of detecting notch filter 3042 and $\zeta n2$ represents an attenuation coefficient. The frequency characteristics of detecting notch filter 3042 are the same as the characteristics illustrated in FIG. 2, which is the case with dn1=0 in notch filter 302. That is, detecting notch filter 3042 has the characteristic of attenuating the component of notch frequency $\omega n2$.

Notch frequency change section 3043 receives: oscillation component Vb1; and oscillation component Vb2 as output provided after passage of oscillation component vb1 through detecting notch filter 3042. Then the notch frequency $\omega n$ is generated which agrees with the frequency of oscillation included in the electric motor speed Vm. The notch frequency $\omega n$ is supplied to notch filter 302 and detecting notch filter 3042 and respective notch frequencies $\omega n1$ and $\omega n2$ are changed to $\omega n$.

Here, when there is a large difference between the frequency of the oscillation component contained in oscillation component Vb1 as an input and notch frequency $\omega n2$ in detecting notch filter 3042, the amplitude of oscillation component Vb1 is not attenuated. On the other hand, when agreement between the two is achieved, the aforementioned amplitude is attenuated. Thus, the amplitude of oscillation component Vb2 increases with an increase in deviation of the oscillation frequency of oscillation component Vb1 from notch frequency $\omega n2$. That is, it can be said that the amplitude of oscillation component Vb2 indicates the degree of the deviation of the oscillation frequency of oscillation component Vb1 from notch frequency $\omega n2$.

Notch frequency change section 3043 sequentially changes, based on the amplitude of oscillation component Vb1 and oscillation component Vb2, the notch frequency $\omega n$ until the amplitude of oscillation component Vb2 becomes less than or equal to a predetermined value or zero, thereby controlling notch center frequency $\omega n2$ of detecting notch filter 3042. Such notch filter control can be realized by combining detecting notch filter 3042 and, for example, a direction filter or notch filter coefficient correction means disclosed in PTL 1.

The control is performed in a manner such that the notch frequency $\omega n$ agrees with the frequency of the oscillation component contained in oscillation component Vb1 as described above. Both notch frequency $\omega n2$ of detecting notch filter 3042 and notch frequency $\omega n1$ of notch filter 302 are changed to agree with the notch frequency $\omega n$. That is, the control is performed in a manner such that the notch frequencies ωn1 and ωn2 turn to be frequencies of the oscillation component contained in oscillation component Vb1.

As described above, notch control section 304 automatically and sequentially changes notch frequency ωn1 of notch filter 302 in a manner such that notch frequency ωn1 agrees with the frequency of the mechanical resonance oscillation component when the electric motor speed Vm contains the mechanical resonance oscillation component. Therefore, the mechanical resonance is always automatically suppressed in the electric motor control device of the present embodiment.

Here, focusing again on FIG. 2 illustrating one example of the frequency characteristics of notch filter 302, illustrated is that the gain characteristic of notch filter 302 is attenuating the component of notch frequency ωn1 as described above while the phase characteristics of notch filter 302 is a value ranging from −90 degrees to 90 degrees. The value is negative with frequencies less than or equal to the notch frequency, providing the effect of delaying the phase of the input signal. Notch filter 302 is arranged inside of the feedback control system by electric motor control device 300, and the phase of the feedback control system is delayed by the phase delay effect with the frequencies less than or equal to the notch frequency. Thus, when the notch frequency overlaps the control bandwidth of the feedback control system, notch filter 302 itself destabilizes the feedback control system, which may make the operation oscillating and may lead to oscillation. To prevent the oscillation caused by the destabilization of the feedback control system while using notch filter 302, it is required to reduce the control bandwidth of the feedback control system with respect to the notch frequency to prevent the notch frequency from overlapping the control bandwidth of the feedback control system.

However, the notch frequency of notch filter 302 is automatically adjusted by notch control section 304 to constantly agree with the mechanical resonance frequency. Thus, when the mechanical resonance frequency decreases to such an extent that overlaps the control bandwidth of the feedback control system, the notch frequency also decreases to such an extent that overlaps the control bandwidth of the feedback control system.

Control coefficient setting section 305 receives input of: a control coefficient signal Sn indicating the current control coefficient of feedback control section 301; and the notch frequency ωn automatically adjusted by notch control section 304 to agree with the mechanical resonance frequency. Then it is determined based on the inputted information whether the overlapping of the notch frequency with the control bandwidth of the feedback control system destabilizes the feedback control system. Upon determination that the feedback control system is destabilized, the control coefficient setting signal Cn as a signal indicating that the control coefficient of feedback control section 301 is changed is outputted to feedback control section 301 to reduce the control bandwidth of the feedback control system. Feedback control section 301 changes the inner control coefficient in accordance with the inputted control coefficient setting signal Cn to reduce the control bandwidth of the feedback control system. Consequently, the control coefficient of the feedback control system is changed to stabilize the feedback control system even when the notch frequency decreases to such an extent that overlaps the feedback control bandwidth, which can prevent the occurrence of the oscillation caused by the destabilization of the feedback control system.

To describe a method for changing a control parameter of feedback control section 301 by control coefficient setting section 305, a configuration of feedback control section 301 will be first described in detail.

Figure 4:
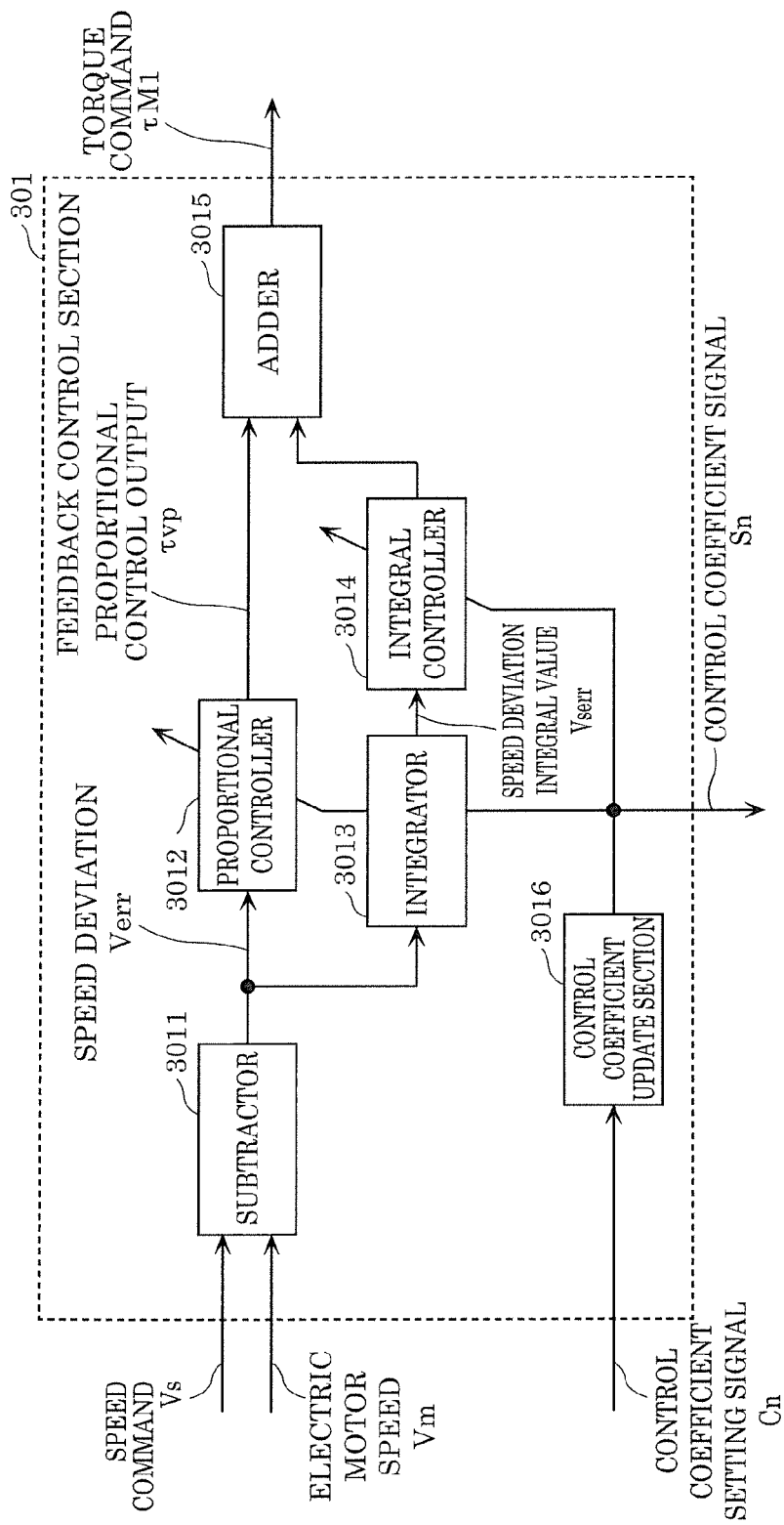
FIG. 4 is a diagram illustrating one example of a configuration of a feedback control section according to Embodiment 1.

FIG. 4 illustrates one example of the configuration of feedback control section 301. Feedback control section 301 has therein: subtractor 3011, proportional controller 3012, integrator 3013, integral controller 3014, adder 3015, and control coefficient update section 3016. Subtractor 3011 receives input of the speed command Vs and the electric motor speed Vm, subtracts the electric motor speed Vm from the speed command Vs, and outputs, as speed deviation Verr, a value obtained through the subtraction. Proportional controller 3012 multiplies the speed deviation Verr by a speed-proportional gain as a weight coefficient and outputs proportional control output τvp. Moreover, the speed deviation Verr is also inputted to integrator 3013 and a speed deviation integral value Vserr as an integral value thereof is outputted. Integral controller 3014 receives input of the speed deviation integral value Vserr and multiplies the speed integral gain as a weight coefficient and outputs an integral control output τvi. Then adder 3015 receives input of the proportional control output τvp and the integral control output τvi and outputs a value obtained by adding together the two as torque command τM1. Control coefficient update section 3016 updates the control coefficient used by feedback control section 301 in accordance with the control coefficient setting signal Cn inputted from control coefficient setting section 305. Feedback control section 301 has therein a proportional integral control system so that the speed command Vs and the electric motor speed Vm agree with each other as described above. Then the control bandwidth of the feedback control system formed inside of electric motor control device 300 is determined based on values of the speed-proportional gain and the speed integral gain. That is, the speed-proportional gain and the speed integral gain are control coefficients related to the control bandwidth of the feedback control system. Control coefficient update section 3016 of feedback control section 301 outputs the current control coefficient as the control coefficient signal Sn to control coefficient setting section 305 so that the control bandwidth of the feedback control system can be determined in control coefficient setting section 305.

Control coefficient setting section 305 receives input of the control coefficient signal Sn and the notch frequency ωn and determines based on the inputted information whether the feedback control system formed inside of electric motor control device 300 is stable. Then upon determination that the feedback control system is unstable, the control coefficient setting signal Cn indicating that the control coefficient of feedback control section 301 is to be changed is outputted to reduce the control bandwidth of the feedback control system to such an extent that permits determination that the feedback control system is stable.

Next, the method for changing the control coefficient of feedback control section 301 by control coefficient setting section 305 will be described in detail. The control bandwidth of the feedback control system will be first described in detail.

Figure 5:
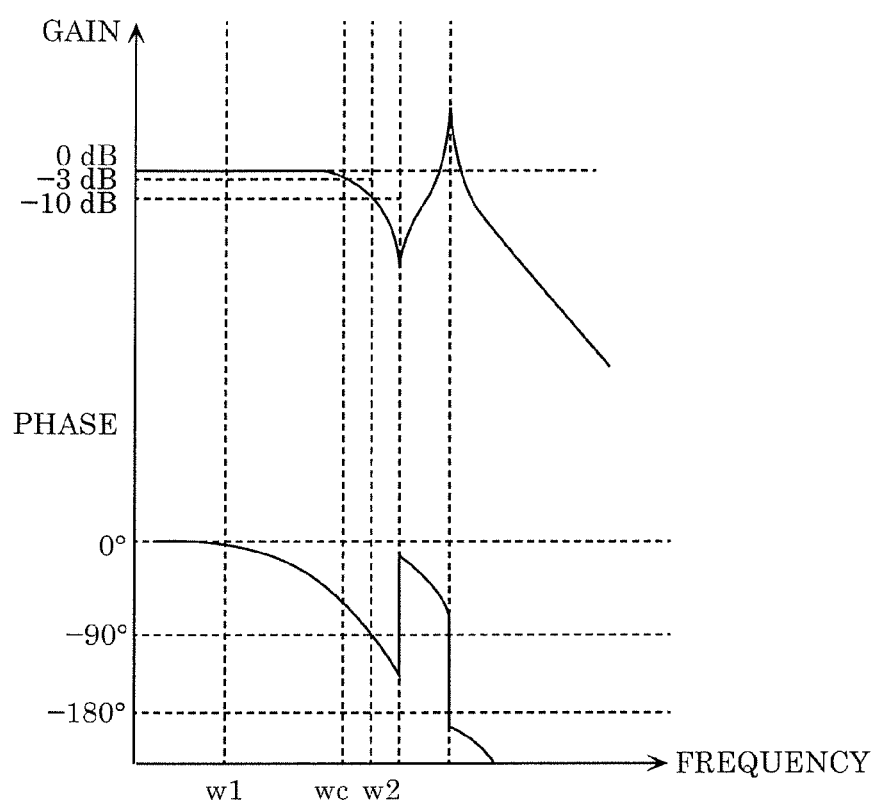
FIG. 5 is a diagram illustrating one example of the frequency characteristic of an electric motor speed with respect to a speed command according to Embodiment 1.

FIG. 5 illustrates one example of frequency characteristics of the electric motor speed with respect to the speed command when notch filter 302 is not in use. The gain characteristic is illustrated at the top and the phase characteristic is illustrated at the bottom. Focusing on the gain characteristic diagram of FIG. 5, the figure illustrates a value 0 dB at frequency value w1. This indicates that for a speed command change at frequency w1, feedback control section 301 performs control such that the magnitude of the electric motor speed agrees with the size of the speed command. On the other hand, the figure illustrates a value −10 dB at frequency value w2. This indicates that, for the speed command change at frequency w2, the magnitude of the electric motor speed becomes −10 dB≈0.32 times of the size of the speed command and thus the magnitude of the electric motor speed no longer agrees with the size of the speed command. That is, in the bandwidth indicating values close to 0 dB on the gain characteristic diagram of the feedback control system, feedback control section 301 performs operation control in a manner such that the electric motor speed agrees with the speed command, and this bandwidth comes to serve as the control bandwidth of the feedback control system.

A smallest frequency value (corresponding to wc in FIG. 5) with which the gain characteristic among the frequency characteristics of the output with respect to input becomes −3 dB≈0.71 times is used as an index indicating the control bandwidth of the feedback control system, and this frequency value is called a cutoff frequency of the feedback control system. Control coefficient setting section 305 calculates the cutoff frequency of the feedback control system from the inputted control coefficient signal Sn and determines based on the values of the calculated cutoff frequency and the notch frequency whether the feedback control system is destabilized.

An upper-limit value of the ratio of the cutoff frequency of the feedback control system with respect to the notch frequency is previously set in control coefficient setting section 305. Control coefficient setting section 305 determines that the feedback control system is stable when the ratio of the cutoff frequency of the feedback control system with respect to the notch frequency is less than or equal to a predetermined value. Then when the ratio of the cutoff frequency of the feedback control system with respect to the notch frequency exceeds the upper-limit value as a result of a decrease in the notch frequency to such an extent that overlaps the control bandwidth of the feedback control system due to a decrease in the mechanical resonance frequency, it is determined that the feedback control system is unstable and a control coefficient is calculated with which the ratio of the cutoff frequency of the feedback control system with respect to the notch frequency becomes less than or equal to the preset upper-limit value. Control coefficient setting section 305 outputs the control coefficient setting signal Cn indicating that the control coefficient of feedback control section 301 is changed to the calculated value. Then the aforementioned cutoff frequency is changed to the value indicated by the inputted control coefficient setting signal Cn in feedback control section 301.

As described above, even when the notch frequency decreases to such an extent that overlaps the control bandwidth of the feedback control system, the control coefficient of feedback control section 301 is changed by control coefficient setting section 305 to a value with which the feedback control system is determined to be stable. Therefore, the feedback control system formed inside of electric motor control device 300 becomes constantly stable, leading to no oscillation caused by the destabilization of the feedback control system.

As described above, when the mechanical resonance frequency decreases to such an extent that overlaps the control bandwidth of the feedback control system, electric motor control device 300 of the present embodiment can reduce the control bandwidth of the feedback control system to thereby prevent the oscillation caused by the destabilization of the feedback control system.

Moreover, it has been described in the present embodiment that control coefficient setting section 305 is configured to change the control bandwidth in accordance with the control bandwidth and the notch frequency to stabilize the feedback control system. Alternatively, control coefficient setting section 305 may be configured to change at least one of the control bandwidth and the filter coefficient of notch filter 302 in accordance with the control bandwidth and the notch frequency to stabilize the feedback control system. For example, when the ratio between the notch frequency and the control bandwidth of the feedback control system has become greater than or equal to the predetermined value, control coefficient setting section 305 can be configured to make a change so that the control bandwidth is reduced and the notch depth coefficient as one of the filter coefficients of notch filter 302 is increased. Providing such a configuration can reduce the degree of the phase delay by notch filter 302 when the mechanical resonance frequency has decreased to such an extent that overlaps the control bandwidth of the feedback control system, which can prevent the oscillation caused by the destabilization of the feedback control system without largely reducing the control bandwidth of the feedback control system.

Moreover, it has been described in the present embodiment that a proportional integral controller is configured to be formed inside of feedback control section 301. Also permitted is a configuration such that notch filter 302 is used for suppressing the mechanical resonance oscillation in a low frequency range and a low-pass filter for suppressing harmonic noise and mechanical resonance oscillation in a high frequency range attributable to, for example, the rough resolution of speed detector 200 is serially connected to a latter part of the proportional integral controller. Also permitted is a configuration such that the cutoff frequency range of the low pass filter can be changed in accordance with the control coefficient setting signal outputted by control coefficient setting section 305. More specifically, the configuration may be such that the control bandwidth of the feedback control system is reduced and the cutoff frequency range of the low pass filter is increased. The low pass filter has the effect of delaying phases of the cutoff frequency or below as is the case with the notch filter. Therefore, the phase delay of the feedback control system decreases with an increase in the cutoff frequency of the low pass filter, stabilizing the feedback control system. Providing the configuration such that the control bandwidth of the feedback control system is reduced and the cutoff frequency range of the low pass filter is increased makes it possible to prevent the oscillation caused by the destabilization of the feedback control system without largely reducing the control bandwidth of the feedback control system while holding the degree of suppressing the mechanical resonance oscillation in a high frequency range.

Moreover, the present embodiment provides the configuration such that control is performed so that the notch frequency of notch filter 302 arranged in the feedback control system constantly becomes the frequency of the oscillation included in the electric motor speed. However, also permitted is a configuration such that only the notch frequency of notch filter 302 arranged in the feedback control system is limited by lower and upper limit values to prevent the overlapping between the control bandwidth of the feedback control system and the notch frequency of notch filter 302 arranged in the feedback control system. That is, permitted is a configuration such that notch control section 304 changes the notch frequency of notch filter 302 only within a predefined range of notch frequencies.

The present embodiment provides the configuration such that the presence or absence of the oscillation is judged based on output of oscillation extracting filter 3041 formed of a low pass filter or a band pass filter which receives the input of the electric motor speed Vm. However, for example, upon the application of temporary external disturbance to mechanical load 102, notch control section 304 changes the notch frequency in response to the external disturbance, which may temporarily change the notch frequency of notch filter 302 to a value which is largely different from the mechanical resonance frequency. The temporary change in the notch frequency reduces the control bandwidth of feedback control section 301 through operation of control coefficient setting section 305, resulting in an extreme change in the operation of the electric motor or the mechanical load from desired operation. Providing such a configuration makes it possible to prevent the extreme change in the operation of the electric motor or the mechanical load from the desired operation due to an inappropriate decrease in the notch frequency and the control bandwidth of the feedback control system even upon the temporary application of the external disturbance to the mechanical load.

Moreover, the present embodiment provides the configuration such that speed detector 200 detects the electric motor speed, but speed detector 200 may be configured to detect the speed of mechanical load 102 and output this speed to feedback control section 301.

Providing such a configuration causes electric motor control device 300 to control the operation of the electric motor in a manner such that the speed command Vs and the speed of the mechanical load agree with each other, thus more decreasing a difference between the speed command and the mechanical load speed.

Embodiment 2

Figure 6:
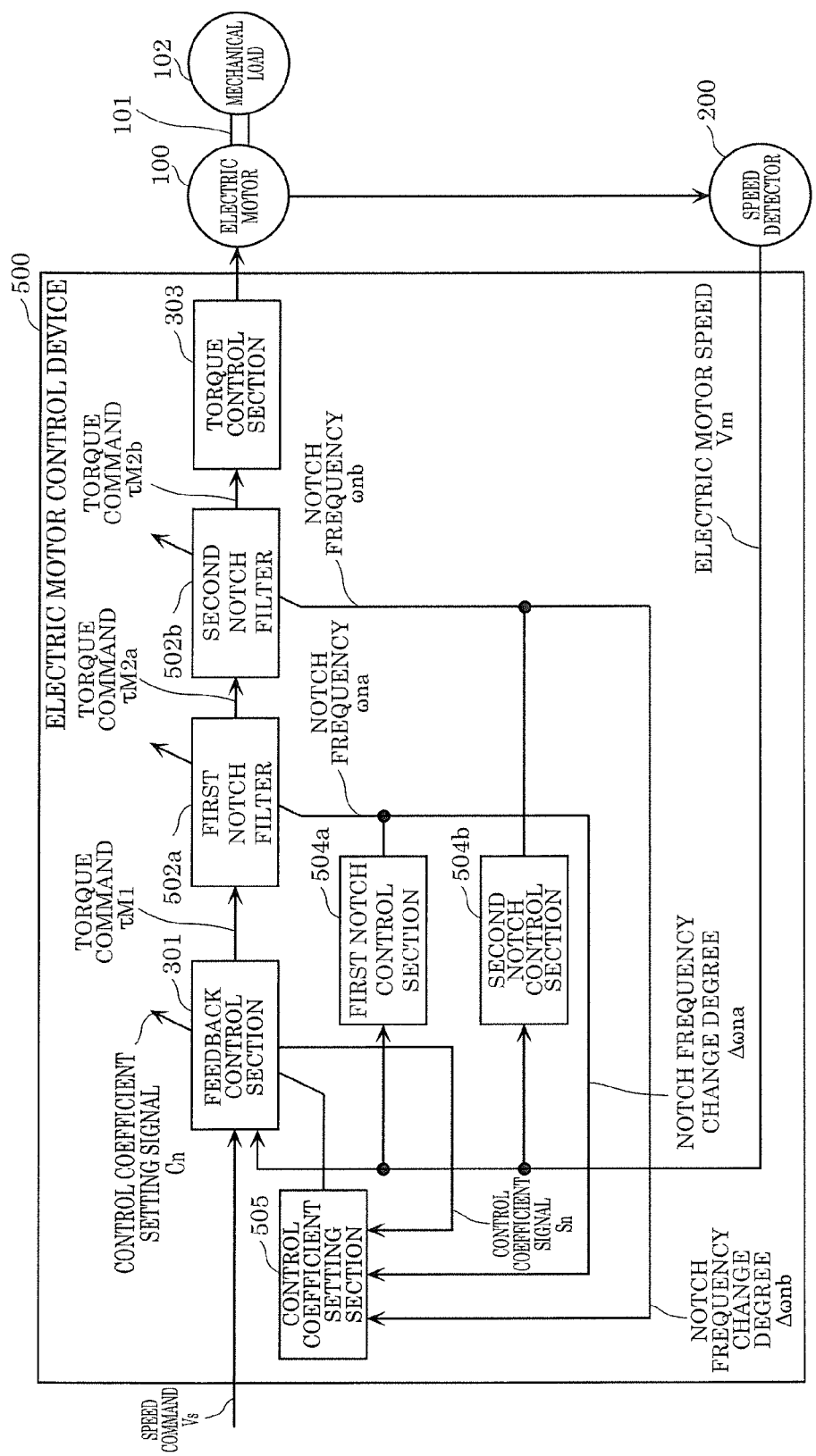
FIG. 6 is a block diagram illustrating one example of a configuration of an electric motor control device according to Embodiment 2.

FIG. 6 is a diagram illustrating one example of a configuration of an electric motor control device according to Embodiment 2. For those having same functions and operation in FIG. 6 as those in FIG. 1 illustrating the configuration of Embodiment 1 described above, the operation thereof will be omitted from the description. Electric motor control device 500 has two notch filters and two notch control sections which differ in number from the configuration illustrated in FIG. 1 by one.

Electric motor control device 500 has first notch filter 502a with notch frequency $\omega n1a$ and second notch filter 502b with notch frequency $\omega n1b$, which are serially connected to a latter part of feedback control section 301 in a manner such that under the presence of two types of mechanical resonance, oscillations caused by the two types of mechanical resonance can be reduced.

First notch filter 502a and second notch filter 502b are identical to notch filter 302 in Embodiment 1.

Notch frequency $\omega n1a$ and notch frequency $\omega n1b$ are respectively set at different values respectively in correspondence with the two mechanical resonance frequencies. Separately provided in order to change the notch frequency of each of the notch filters are: first notch control section 504a corresponding to first notch filter 502a; and second notch control section 504b corresponding to second notch filter 502b.

First notch control section 504a and second notch control section 504b are identical to notch control section 304 in Embodiment 1. More specifically, first notch control section 504a changes a first notch frequency as the center frequency of first notch filter 502a to remove the oscillation component attributable to the mechanical resonance related to electric motor 100. Second notch control section 504b changes a second notch frequency as the center frequency of second notch filter 502b to remove the oscillation component attributable to the mechanical resonance related to electric motor 100. That is, when the two mechanical resonance frequencies have changed, first notch control section 504a and second notch control section 504b make changes, for the oscillation caused in response to the changes in the respective mechanical resonance frequencies, in a manner such that the notch frequencies of the corresponding notch filters agree with the frequency of the generated oscillation component, and outputs the notch frequencies obtained through the change as $\omega na$ and $\omega nb$, respectively, to control coefficient setting section 505.

To make the two notch filters detect the changes in the mutually different mechanical resonance frequencies, for example, the pass bands for oscillation extracting filters located inside of the respective notch control sections may be set at bands which are mainly focused on the two different mechanical resonance frequencies and which do not overlap each other. Consequently, each of the two notch control sections can perform the control in a manner such that the frequency of the oscillation caused by the change in the corresponding mechanical resonance frequency and the notch frequency of the corresponding notch filter agree with each other without the influence of a change in the other mechanical resonance frequency.

Control coefficient setting section 505 changes at least one of the control bandwidth of the feedback control system, the filter coefficient of first notch filter 502a, and the filter coefficient of second notch filter 502b in accordance with the control bandwidth, the first notch frequency, and the second notch frequency to stabilize the feedback control system. More specifically, control coefficient setting section 505 receives input of the control coefficient signal Sn indicating the control coefficient of feedback control section 301 and the two notch frequencies $\omega na$ and $\omega nb$ and determines based on the inputted information whether the feedback control system formed inside of electric motor control device 500 is unstable. Upon determination that the feedback control system is unstable, outputted is the control coefficient setting signal Cn as the signal indicating that the control bandwidth of feedback control section 301 is changed to reduce the control bandwidth of the feedback control system to such an extent that permits determination that the feedback control system is stable.

Next, a method for changing the control coefficient of feedback control section 301 by control coefficient setting section 505 will be described in detail. An upper limit value of the ratio of the cutoff frequency indicating the control bandwidth of the feedback control system with respect the notch frequency is previously set in control coefficient setting section 505. Control coefficient setting section 505 calculates, from the control coefficient signal Sn, the cutoff frequency indicating the control bandwidth of the feedback control system. When the ratio of the cutoff frequency of the feedback control system with respect to either of the notch frequencies $\omega na$ and $\omega nb$, whichever is smaller, is less than or equal to the set upper limit value, control coefficient setting section 505 determines that the feedback control system is stable. When the ratio of the cutoff frequency of the feedback control system with respect to either of the notch frequencies $\omega na$ and $\omega nb$, whichever is smaller, exceeds the upper limit value, control coefficient setting section 505 determines that the feedback control system is unstable, and calculates a control coefficient such that the ratio of the cutoff frequency of the feedback control system with respect to the smaller notch frequency becomes less than or equal to the upper limit value. Control coefficient setting section 505 outputs the control coefficient setting signal Cn indicating that the control bandwidth of feedback control section 301 is changed to the calculated value. The control coefficient is changed in feedback control section 301 to the value indicated by the control coefficient setting signal Cn in which the control coefficient is inputted.

As described above, when the control bandwidth of feedback control section 301 decreases to an extent such that the smaller notch frequency included in the two notch frequencies overlaps the control bandwidth of the feedback control system, the control coefficient of feedback control section 301 is changed by control coefficient setting section 505 to a value that permits the determination that the feedback control system is stable. Therefore, the feedback control system formed inside of electric motor control device 500 becomes constantly stabile, leading to no oscillation caused by the destabilization of the feedback control system.

With the configuration such that control coefficient setting section 505 changes the control coefficient of feedback control section 301 as described above, even under the presence of two types of mechanical resonance, when at least one of two mechanical resonance frequencies decreases to such an extent that overlaps the control bandwidth of the feedback control system, the oscillation caused by the destabilization of the feedback control system can be prevented by reducing the control bandwidth of the feedback control system based on the notch frequency of the notch filter, among the two notch filters, which more reduces the phase characteristic of the feedback control system.

As described above, when two types of mechanical resonance are present and at least one of the two mechanical resonance frequencies decreases to such an extent that overlaps the control bandwidth of the feedback control system, electric motor control device 500 of the present embodiment can reduce the control bandwidth of the feedback control system, thereby preventing the oscillation caused by the destabilization of the feedback control system.

Moreover, the present embodiment provides the configuration such that the two notch filters and the two notch control sections are formed but three or more notch filters and notch control sections may be formed. In this case, each notch control section of each notch filter is only required to work in the same manner as in the present embodiment. With such a configuration provided, even when three or more types of mechanical resonance are present and, with respect to a change in each mechanical resonance frequency, at least one of the mechanical resonance frequencies decreases to such an extent that overlaps the control bandwidth of the feedback control system, the oscillation caused by the destabilization of the feedback control system can be prevented by reducing the control bandwidth of the feedback control system.

Embodiments 1 and 2 provide the configuration such that the electric motor control devices have a feedback control section which performs feedback control in a manner such that the electric motor speed follows the speed command. However, in addition to the feedback control section, a feed forward control section may be provided which calculates, based on the speed command, a torque command such that the electric motor speed agrees with the speed command.

Moreover, Embodiments 1 and 2 provide the configuration such that the electric motor control devices control the electric motor speed but the electric motor control devices may be configured to control the position of the electric motor.

INDUSTRIAL APPLICABILITY

The present invention is widely applicable to a control device of an electric motor which drives machine equipment with a variable mechanical resonance frequency.

REFERENCE MARKS IN THE DRAWINGS 100 electric motor
200 speed detector
300, 500 electric motor control device
301 feedback control section
302 notch filter
303 torque control section
304 notch control section
305, 505 control coefficient setting section
502a first notch filter
502b second notch filter
504a first notch control section 504a
504b second notch control section 504b
3011 subtractor
3012 proportional controller
3013 integrator
3014 integral controller
3015 adder
3016 control coefficient update section
3041 oscillation extracting filter
3042 detecting notch filter
3043 notch frequency change section

The invention claimed is:

1. An electric motor control device including a detector that detects a state amount of an electric motor or a load and a feedback control system that performs feedback control based on an output of the detector, the electric motor control device configured to change a control bandwidth of the feedback control system, the electric motor control device comprising:
   a first notch filter arranged in the feedback control system, the first notch filter having a first notch frequency which is changeable, the first notch frequency being a center frequency;
   a first notch control section which changes the first notch frequency to remove an oscillation component attributable to mechanical resonance related to the electric motor; and
   a control coefficient setting section which changes the control bandwidth,
   wherein the feedback control system includes a feedback control section that generates a torque command based on a speed command, an output of the detector, and the control bandwidth set by the control coefficient setting section, and supplies the torque command to the first notch filter, and
   when the feedback control section determines, based on the first notch frequency set by the first notch control section and a currently set value of a control coefficient of the feedback control section, that a ratio of the first notch frequency and the control bandwidth is a predetermined value or higher or that the first notch frequency overlaps the control bandwidth, the feedback control section decreases the control bandwidth of the feedback control system to stabilize the feedback control system.

2. The electric motor control device according to claim 1, wherein
the first notch control section changes the first notch frequency only within a predefined range of first notch frequencies.

3. The electric motor control device according to claim 2, wherein
the predefined range of first notch frequencies is defined to prevent the first notch frequency from overlapping the control bandwidth of the feedback control system.

4. The electric motor control device according to claim 1, further comprising:
a second notch filter serially arranged with the first notch filter in the feedback control system the second notch filter having a second notch frequency which is changeable, the second notch frequency being a center frequency; and
a second notch control section which changes the second notch frequency to remove the oscillation component attributable to the mechanical resonance related to the electric motor
wherein the control coefficient setting section changes at least one of the control bandwidth, a filter coefficient of the first notch filter, or a filter coefficient of the second notch filter in accordance with the control bandwidth, the first notch frequency, and the second notch frequency to stabilize the feedback control system.

5. An electric motor control device control method for performing feedback control of a state amount of an electric motor or a load in the electric motor control device according to claim 1 which is configured to change a control bandwidth of a feedback control system, the electric motor control device control method comprising;

changing a notch frequency as a center frequency of a notch filter arranged in the feedback control system and having a filter coefficient which is changeable to remove an oscillation component attributable to mechanical resonance related to the electric motor; and
changing at least one of the control bandwidth or the filter coefficient of the notch filter in accordance with the control bandwidth and the notch frequency to stabilize the feedback control system.

6. The electric motor control device according to claim 1, wherein the control coefficient setting section determines the feedback control system to be unstable when the ratio of the first notch frequency and the control bandwidth is the predetermined value or higher or when the first notch frequency overlaps the control bandwidth.

7. The electric motor control device according to claim 1, wherein
the first notch filter has a first notch coefficient which is changeable, and
the control coefficient setting section changes the first notch coefficient when the control coefficient setting section determines that the ratio of the first notch frequency and the control bandwidth is the predetermined value or higher or that the first notch frequency overlaps the control bandwidth.

8. The electric motor control device according to claim 7, wherein
the first notch coefficient is a notch depth coefficient, and
the control coefficient setting section increases the notch depth coefficient when the control coefficient setting section determines that the ratio of the first notch frequency and the control bandwidth is the predetermined value or higher or that the first notch frequency overlaps the control bandwidth.

* * * * *